US010120781B2

(12) United States Patent
Hu et al.

(10) Patent No.: US 10,120,781 B2
(45) Date of Patent: Nov. 6, 2018

(54) TECHNIQUES FOR DETECTING RACE CONDITIONS

(71) Applicant: INTEL CORPORATION, Santa Clara, CA (US)

(72) Inventors: Shiliang Hu, Los Altos, CA (US); Gilles A. Pokam, Fremont, CA (US); Cristiano L. Pereira, Groveland, CA (US); Justin E. Gottschlich, Santa Clara, CA (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/026,515

(22) PCT Filed: Dec. 12, 2013

(86) PCT No.: PCT/US2013/074661
§ 371 (c)(1),
(2) Date: Mar. 31, 2016

(87) PCT Pub. No.: WO2015/088534
PCT Pub. Date: Jun. 18, 2015

(65) Prior Publication Data

US 2016/0232077 A1 Aug. 11, 2016

(51) Int. Cl.
*G06F 9/44* (2018.01)
*G06F 9/45* (2006.01)
(Continued)

(52) U.S. Cl.
CPC .......... *G06F 11/3632* (2013.01); *G06F 9/526* (2013.01); *G06F 11/30* (2013.01);
(Continued)

(58) Field of Classification Search
CPC ............ G06F 11/3466; G06F 11/3409; G06F 11/3419; G06F 2201/865; G06F 11/3644
See application file for complete search history.

(56) References Cited

U.S. PATENT DOCUMENTS 4,435,759 A 3/1984 Baum et al.
4,503,497 A 3/1985 Krygowski et al.
(Continued)

FOREIGN PATENT DOCUMENTS

WO 2012-038780 A1 3/2012

OTHER PUBLICATIONS

Di et al., "Accelerating Dynamic Data Race Detection Using Static Thread Interference Analysis", ACM, Mar. 2016, pp. 1-10; <https://dl.acm.org/citation.cfm?id=2883405>.*
(Continued)

*Primary Examiner* — Thuy Dao
*Assistant Examiner* — Ben C Wang

(57) ABSTRACT

Various embodiments are generally directed to detecting race conditions arising from uncoordinated data accesses by different portions of an application routine by detecting occurrences of a selected cache event associated with such accesses. An apparatus includes a processor component; a trigger component for execution by the processor component to configure a monitoring unit of the processor component to detect a cache event associated with a race condition between accesses to a piece of data and to capture an indication of a state of the processor component to generate monitoring data in response to an occurrence of the cache event; and a counter component for execution by the processor component to configure a counter of the monitoring unit to enable capture of the indication of the state of the
(Continued)

processor component at a frequency less than every occurrence of the cache event. Other embodiments are described and claimed.

22 Claims, 10 Drawing Sheets

(51) Int. Cl.
*G06F 11/36* (2006.01)
*G06F 9/52* (2006.01)
*G06F 11/30* (2006.01)
*G06F 11/34* (2006.01)

(52) U.S. Cl.
CPC ...... *G06F 11/3409* (2013.01); *G06F 11/3419* (2013.01); *G06F 11/3466* (2013.01)

(56) References Cited

U.S. PATENT DOCUMENTS 6,766,511 B1 * 7/2004 Berry .................. G06F 11/3476 714/45
7,240,303 B1 * 7/2007 Schubert .......... G01R 31/31705 703/13
7,448,025 B2 * 11/2008 Kalafatis ............. G06F 11/3409 714/E11.192
7,543,187 B1 6/2009 Madan
7,895,415 B2 * 2/2011 Gonzalez .............. G06F 9/3009 712/220
8,392,929 B2 * 3/2013 Taillefer .............. G06F 11/3648 711/170
9,086,973 B2 * 7/2015 Vorbach .................. G06F 9/526
9,898,385 B1 * 2/2018 O'Dowd ............. G06F 11/3644
9,928,158 B2 * 3/2018 Cain, III ............. G06F 11/3636
2002/0124237 A1 * 9/2002 Sprunt ................ G06F 11/3409 717/127
2003/0056149 A1 3/2003 Hue
2003/0140326 A1 7/2003 Ouyang
2004/0255277 A1 12/2004 Berg et al.
2005/0091645 A1 * 4/2005 Chilimbi ............. G06F 11/3636 717/130
2005/0091646 A1 * 4/2005 Chilimbi ............. G06F 11/3636 717/130
2006/0200823 A1 9/2006 Rodenheffer et al.
2006/0224873 A1 10/2006 McCormick, Jr. et al.
2008/0195849 A1 * 8/2008 Gonzalez .............. G06F 9/3009 712/223
2009/0282288 A1 11/2009 Wang et al.
2009/0319758 A1 12/2009 Kimura
2010/0077143 A1 * 3/2010 Reid ..................... G06F 11/348 711/118
2011/0145530 A1 * 6/2011 Taillefer .............. G06F 11/3648 711/163
2012/0137075 A1 * 5/2012 Vorbach .................. G06F 9/526 711/122
2013/0254491 A1 * 9/2013 Coleman ............... G06F 12/126 711/133
2014/0189256 A1 * 7/2014 Kranich .................. G06F 9/526 711/147
2014/0289256 A1 * 9/2014 Cochrane .......... G06F 17/30595 707/740
2014/0380283 A1 * 12/2014 Hu ...................... G06F 11/3604 717/132
2015/0026687 A1 * 1/2015 Yim ........................ G06F 9/522 718/102
2015/0046752 A1 * 2/2015 Cain, III ............. G06F 11/3668 714/38.1
2016/0147639 A1 * 5/2016 Cain, III ............. G06F 11/3668 714/15
2016/0179674 A1 * 6/2016 Sury ................... G06F 12/0833 711/141

OTHER PUBLICATIONS

Song et al., "A Parallel FastTrack Data Race Detector on Multi-core Systems", IEEE, Jul. 2017, pp. 387-396; <https://ieeexplore.ieee.org/stamp/stamp.jsp?tp=&arnumber=7967128>.*
Yu et al., "Experimental Performance Comparison of Dynamic Data Race Detection Techniques", ETRI Journal, vol. 39, No. 1, Feb. 2018, pp. 124-134; <https://onlinelibrary.wiley.com/doi/pdf/10.4218/etrij.17.0115.1027>.*
International Search Report dated Sep. 18, 2014 in International Patent Application No. PCT/US2013/074661.
Office Action received for Japanese Patent Application No. 2016-530004, dated May 30, 2017, 3 pages English translation.
Extended European Search Report received for European Patent Application No. 13899151.8, dated Jun. 22, 2017, 8 pages.

* cited by examiner

TECHNIQUES FOR DETECTING RACE CONDITIONS

TECHNICAL FIELD

Embodiments described herein generally relate to detecting possible race conditions in accesses to data by different threads of an application routine.

BACKGROUND

It has become commonplace for a wide variety of application routines to be written for multi-threaded execution. This arises from the incorporation of processor components capable of supporting multi-threaded execution into an increasing variety of computing devices. However, while multi-threaded execution provides numerous advantages, the work of writing portions of an application routine to execute concurrently on different threads in a coordinated manner presents challenges. Mistakes resulting in uncoordinated accesses (e.g., read and write operations, or pairs of write operations) by different portions of an application routine to the same data are not uncommon, and can beget unexpected behavior that can be difficult to trace to the mistakes that were made in writing in the application routine.

Of particular concern are instances of one portion of an application routine that reads data close enough in time to when another portion of the application routine writes that same data that it is not reliably predictable which of the read and write operations will occur before the other. Thus, the read operation may retrieve the data either before or after it is modified by the write operation. Also of particular concern are instances in which the same data is twice written to in a pair of uncoordinated write operations such that the state of that data it is not reliably predictable after those two write operations. In other words, a lack of coordination between two accesses to the same data leads to an insufficiently coordinated result.

Various techniques have been devised to trace, step-by-step, the execution of each such portion of an application routine on their separate threads, including executing a debugging routine alongside those different portions to monitor various break points inserted among the instructions of those portions and/or to monitor their data accesses. However, such debugging routines typically consume considerable processing and/or storage resources, themselves. Indeed, the fact of the execution of such a debugging routine alongside an application routine may consume enough resources to alter the behavior of the application routine such that the uncoordinated accesses that are sought to be traced for debugging simply never occur. Further, in situations where the processing and/or storage resources provided by a computing device are closely matched to the resources required by an application routine, there may be insufficient resources available to accommodate the execution of both the application routine and such a debugging routine.

DETAILED DESCRIPTION

Figure 1:
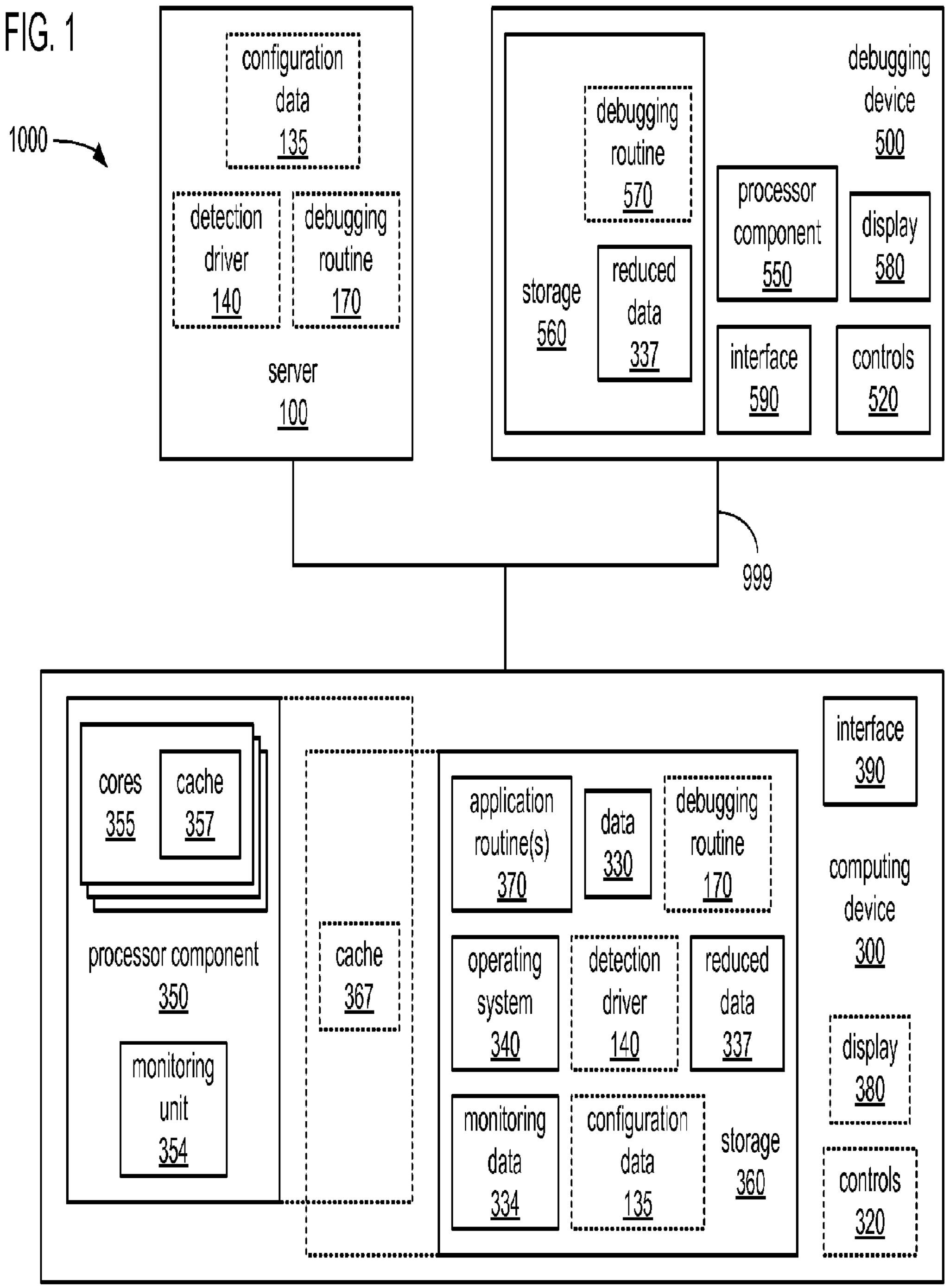
FIG. 1 illustrates an embodiment of a race condition debugging system.

Various embodiments are generally directed to detecting race conditions arising from uncoordinated accesses to data by different portions of an application routine or by related application routines by detecting occurrences of one or more specified cache events that tend to be associated with such uncoordinated accesses. A monitoring unit of a processor component is configured to capture indications of the state of the processor component associated with such cache events. The monitoring unit provides those captured indications to a detection driver for filtering and/or relaying to a debugging routine to enable debugging of the application routine or of the related application routines.

As familiar to those skilled in the art, cache coherency mechanisms are employed to ensure that the contents of a cache do not fail to be synchronized with the contents of other storages, including other caches, in a manner that results in a processor component reading and using incorrect data. Such cache coherency mechanisms often entail operations that store data in a cache line, retrieve data from a cache line, instruct a cache to mark data in a cache line as invalid and/or to make a cache line available, and still other operations that change the state associated with data stored in a cache line. In some embodiments, the cache coherency mechanism employed may be based on the widely known and widely used modified-exclusive-shared-invalidated (MESI) algorithm.

Regardless of the specific cache coherency mechanism used, one or more of the operations affecting the state associated with data stored in a cache line may be cache events that are able to be detected by a monitoring unit incorporated into a processor component. Such a monitoring unit may be programmable to monitor for one or more specified cache events and/or to capture indications of one or more aspects of the state of a core of the processor component upon detecting the one or more specified cache events. The captured indications may include an indicator of the type of cache event that occurred, an indicator of the type of data access (e.g., a read or write operation) that triggered the cache event, an identifier of a process and/or thread of execution that caused the data access, an indication of an address of an instruction pointer, the contents of one or more registers of the processor component, etc.

The one or more specified cache events monitored for may include one or more types cache event that arise from a succession of accesses to the same piece of data that occur relatively close in time (e.g., one access occurring immediately after another). Of particular interest are cache events that may arise from an uncoordinated combination of read and write operations or from an uncoordinated pair of write operations involving the same piece of data by two concurrently executed portions of an application routine. Alternatively, such uncoordinated accesses may be made by two or more related application routines that are meant to coordinate such accesses as they are executed concurrently. Such a lack of coordination may result in a race condition between the read and write operations in which the read operation unpredictably retrieves the piece of data either before or after it has been altered by the write operation, or a race condition between two write operations in which it the resulting state of the data becomes unpredictable. Such cache events may involve an explicit communication to a cache to preemptively invalidate a cache line as a result of an imminent or ongoing succession of accesses to the same data stored in another cache line of another cache. An example of such a cache event may be a "request for ownership" or "read for ownership" (RFO) cache event. Alternatively or additionally, such cache events may involve an access to data in a cache line of one cache that has been invalidated as a result of having been both stored and modified in another cache line of another cache. An example of such a cache event may be a "hit modified" (HITM) cache event.

Indications of the state of a processor component associated with a specific cache event may be captured each time that cache event occurs, or may be captured at a lesser specified frequency. By way of example, such capturing may take place only on every fifth occurrence of the specified cache event. This may be done to reduce processing and/or storage requirements, especially where the specified cache event is expected to occur frequently. This may also be done with the expectation that a mistake within an application routine that causes a race condition ought to occur with sufficient frequency as to be likely to be captured, even though the capturing does not take place each time the specified cache event occurs.

The programming of the monitoring unit may be performed by a detection driver that also receives the captured indications of the one or more specified cache events from the monitoring unit. The detection driver may filter the captured indications it receives to generate reduced data made up of a more limited set of indications to reduce the overall quantity of data to be provided to a debugging routine. The debugging routine may be executed by a processor component of the same computing device in which the application routine is executed. Alternatively, the debugging routine may be executed by a processor component of a different computing device, and the reduced data may be transmitted to the other computing device via a network.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will be apparent from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an embodiment of a race condition debugging system 1000 incorporating one or more of a server 100, a computing device 300 and a debugging device 500. Each of these computing devices 100, 300 and 500 may be any of a variety of types of computing device, including without limitation, a desktop computer system, a data entry terminal, a laptop computer, a netbook computer, a tablet computer, a handheld personal data assistant, a digital camera, a smartphone, a smart wristwatch, smart glasses, a body-worn computing device incorporated into clothing, a computing device integrated into a vehicle (e.g., a car, a bicycle, a wheelchair, etc.), a server, a cluster of servers, a server farm, etc.

As depicted, subsets of these computing devices 100, 300 and 500 may exchange signals via a network 999 that are associated with the debugging of race conditions in accessing data arising from concurrent execution of portions of a single application routine 370 or of multiple related application routines 370 on the computing device 300. However, one or more of these computing devices may exchange other data entirely unrelated to such debugging with each other and/or with still other computing devices (not shown) via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the computing device 300 incorporates one or more of a processor component 350, a storage 360, controls 320, a display 380 and an interface 390 to couple the computing device 300 to the network 999. The processor component 350 incorporates a monitoring unit 354, and one or more cores 355 that each incorporate a cache 357. Each of the caches 357 may be a level 1 (L1) and/or level 2 (L2) cache, and each may be dedicated for use by the one of the cores 355 into which it is incorporated. The computing device 300 may additionally incorporate an additional cache 367 that may be shared by multiple ones of the cores 355. The cache 367 may be incorporated into the processor component 350, or into a controller or other circuitry by which the storage 360 is coupled to the processor component 350, and may be a L2 or level 3 (L3) cache.

The monitoring unit 354 may monitor the state of each of the cores 355 to detect occurrences of any of a variety of events and may be operable to capture aspects of the state of each of the cores 355, including the state of one or more registers of each of the cores 355. The monitoring unit 354 may be directly coupled to the caches 357 of each of the cores 355 to directly monitor cache events associated with the operation of each of the caches 357. In embodiments in which the cache 367 is incorporated into the processor component 350, the monitoring unit 354 may be directly coupled to the cache 367 to directly monitor cache events associated with the operation of the cache 367. In embodiments in which the cache 367 is not incorporated into the processor component 350 (e.g., the cache 367 is incorporated into or otherwise associated with the storage 360), the monitoring unit 354 may monitor communications exchanged between the processor component 350 and the cache 367 that may be indicative of cache events associated with the cache 367. Stated differently, the monitoring unit 354 monitors for the occurrence of one or more specific types of cache event occurring in connection with each of the caches 357 and/or in the cache 367, and to capture indications of the state of one or more of the cores 355 in response to occurrences of the one or more specific types of cache event.

The storage 360 stores one or more of an operating system 340, data 330, a detection driver 140, configuration data 135, monitoring data 334, reduced data 337 and a debugging routine 170. Also stored within the storage 360 is either one of the application routine 370 or multiple related ones of the application routine 370. Each of the operating system 340, the application routine(s) 370, the detection driver 140 and the debugging routine 170 incorporates a sequence of instructions operative on the processor component 350 in its role as a main processor component of the computing device 300 to implement logic to perform various functions.

In executing the operating system 340, the processor component 350 may provide various forms of support for the execution of the application routine(s) 370, including callable system functions to provide various services. The operating system 340 may provide a layer of abstraction between the application routine(s) 370 and hardware components of the computing device 300 and/or their device drivers. Among the hardware components and related device drivers from which a layer of abstraction may be provided may be the monitoring unit 354 and the detection driver 140. The operating system 340 provides support for the concurrent execution of multiple portions of a single application routine 370 or for the concurrent execution of portions of related application routines 370 in separate ones of multiple threads of execution by the processor component 350. A single one of the application routines 370 may be any of a variety of types of routine selected for execution on the computing device 300 by the processor component 350 with the support of the operating system 340 to perform any of a variety of personal and/or professional functions, including word processors, website viewers, photograph editors, meeting schedule management, CAD/CAM, etc. Where there are multiple ones of the application routine 370, they may be related application routines of a set of application routines, such as, and not limited to, a word processing application and an illustration application of the same "productivity suite" of application routines, or a website browsing application and an "extension" application to enable viewing of a particular type of data provided by a website.

In executing the detection driver 140, the processor component 350 configures the monitoring unit 354 to detect occurrences of one or more specific cache events associated with one or more of the caches 357 and/or the cache 367. In so doing, the processor component 350 may be caused to specify the one or more cache events through setting bits of one or more registers associated with the monitoring unit 354. The processor component 350 may retrieve indications of the one or more cache events to be detected from the configuration data 135. Of particular interest may be cache events that arise as a result of combinations of read and write operations involving the same piece of data that occur relatively close together in time. Given the closeness in time and a lack of coordination, the read operation may unpredictably occur either before or after the write operation, thereby causing a race condition between the read and write operations such that a wrong version of that piece of data is sometimes retrieved in the read operation and sometimes not. Alternatively or additionally, of particular interest may be cache events that arise as a result of combinations of multiple write operations involving the same piece of data that occur relatively close together in time. Given the closeness in time and a lack of coordination, one of the write operations may unpredictably occur either before or after another, thereby causing a race condition between the multiple write operations such that the state of the data following the multiple write operations is rendered unpredictable. It is possible that such uncoordinated combinations of accesses to the same piece of data result from a lack of coordination either between two concurrently executed portions of a single application routine 370, or between two concurrently executed application routines 370 that are related such that they are meant to coordinate their accesses.

Upon being so configured, the monitoring unit 354 captures indications of the state of one or more of the cores 355 of the processor component 350 in response to the occurrence of one of the one or more specified cache events, and provides the captured indications to the detection driver 140 as the monitoring data 334. The captured indications may include indications of the state of one or more registers associated with one or more of the cores 355, indications of addresses stored in one or more instruction pointers, indications of instructions being executed, indications of identities of processes and/or threads being executed by one or more of the cores 355, etc. The captured indications may also include indications of the state of one or more cache lines of one or more of the caches 357 and/or of the cache 367. The captured indications may also include indications of cache protocol signals exchanged among the caches 357 and/or 367. This may include indications of cache protocol signals exchanged between the processor component 350 and the cache 367 in embodiments in which the cache 367 is external to the processor component 350. These various indications may provide indications of what access instruction(s) of what portion(s) of the application routine 370 were executed that triggered the occurrence of the specified cache event that triggered the capturing of the indications.

In further executing the detection driver 140, the processor component 350 may also configure a counter of the monitoring unit 354 to recurringly count a specified number of occurrences of a specified cache event before capturing indications of the state of the processor component 350. In other words, instead of capturing indications of the state of the processor component 350 in response to every occurrence of a specified cache event, the monitoring unit 354 may be caused to capture indications of the state of the processor component 350 for a sample subset of the occurrences of the specified cache event, thereby reducing the frequency with which such capturing is performed. More specifically, the monitoring unit 354 may be configured to capture the state of the processor component 350 at only every "Nth" of the specified cache event in which the frequency at which captures are performed is controlled by the value of N. The frequency with which the captures are performed (e.g., the value of N) may also be specified in the configuration data 135. Capturing the state of the processor component 350 less frequently than upon every occurrence of the specified cache event may be deemed desirable to reduce processing and/or storage resources required in processing and/or relaying the captured indications to a debugging routine. Further, this may be done with the expectation that a mistake in one of the application routines 370 that results in occurrences of data access race conditions between concurrently executed portions of one or more than one of the application routines 370 that trigger the specified cache event are likely to occur sufficiently often as to render capturing the state of the processor component 350 in response to each occurrence unnecessary. Stated differently, such sampling of the state of the processor component 350 for less than all of such occurrences may be deemed likely to provide sufficient information to at least narrow down the location of a mistake causing a race condition within the instructions making up one of the application routines 370.

In still further executing the detection driver 140, the processor component 350 may operate one or more registers of the monitoring unit 354 and/or signal the monitoring unit 354 via another mechanism to dynamically enable and/or disable the monitoring for the one or more specified cache events. The processor component 350 may be triggered to do so in response to indications of whether one or more than one of the application routines 370 are currently being executed. Such indications may be conveyed directly between the application routine(s) 370 and the detection driver 140, or may be relayed through the operating system 340 and/or through the debugging routine 170 (if present).

Regardless of whether captures of the state of the processor component 350 are performed upon every occurrence of a specified cache event or less frequently, the processor component 350 may be caused by the detection driver 140 to filter the monitoring data 334 to generate the reduced data 337 with a subset of the indications of the monitoring data 334. The monitoring data 334 may contain indications of more pieces of information concerning the state of the processor component 350 than is actually needed to enable debugging of possible race conditions in accesses to data made by separate concurrently executed portions of the application routine 370. The indications of the monitoring data 334 may be filtered to remove indications associated with ones of the cores 355, processes and/or threads not involved in executing any portion of the application routine (s) 370. To enable this, the processor component 350 may retrieve identifiers of the cores 355, processes and/or threads that are involved in executing portions of the application routine(s) 370, and/or identifiers of the portions that are executed. Such identifiers may then be compared to identifiers of the monitoring data 334 to identify indications in the monitoring data 334 that are associated with a cache event unrelated to a possible race condition between accesses made by portions of the application routine(s) 370. Depending on the architecture of the operating system 340, such identifiers may be retrieved from the application routine(s) 370 through the operating system 340 and/or through the debugging routine 170 (if present). Alternatively or additionally, the indications of the monitoring data 334 may be filtered to remove indications associated with registers of the processor component 350 not associated with accessing data.

In some embodiments, the processor component 350 may provide the reduced data 337 to the debugging routine 170 to enable debugging of possible race conditions in data accesses between portions of the application routine(s) 370 on the computing device 300. In so doing, and depending on the architecture of the operating system 340, such a conveyance of the reduced data 337 from the detection driver 140 to the debugging routine 170 may be performed at least partly through the operating system 340. In other embodiments, the processor component 350 may operate the interface 390 to transmit the reduced data 337 to the debugging device 500 to enable debugging to be performed thereon.

Figure 3:
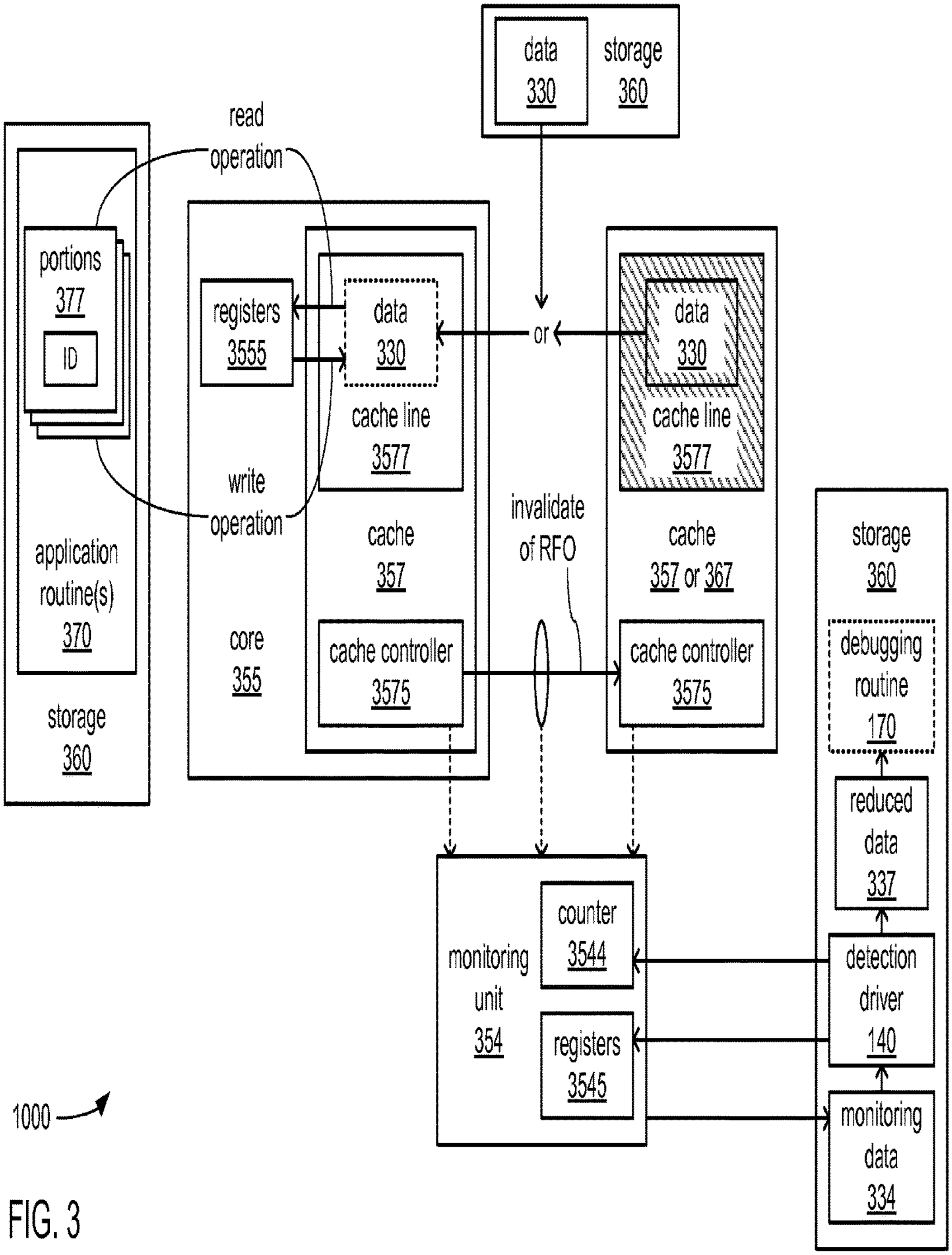
FIGS. 3-4 each illustrate detection of a cache event according to an embodiment.
Figure 4:
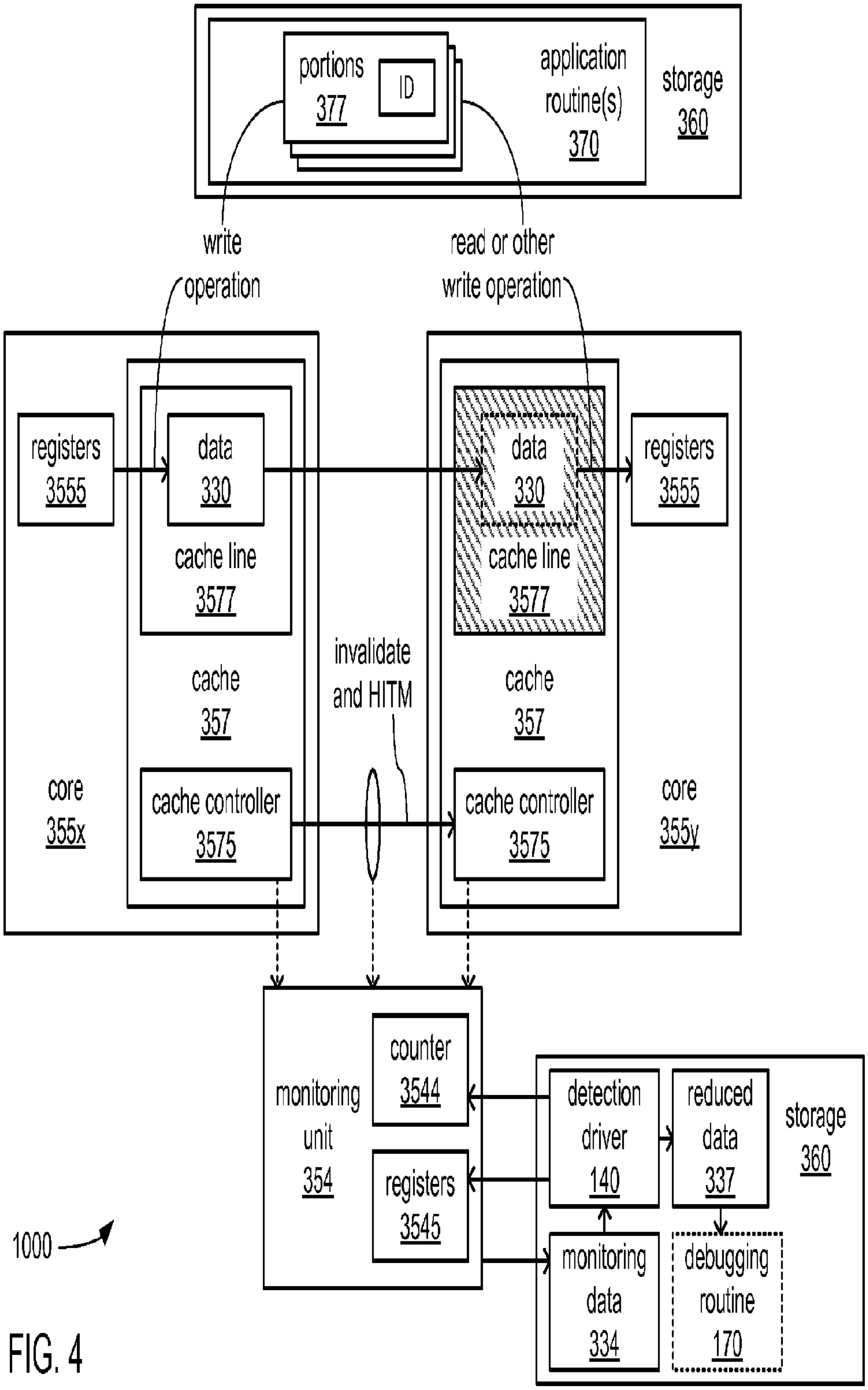

FIGS. 3 and 4 each depict an embodiment of operation of components of the computing device 300 to detect a specific cache event. More specifically, FIG. 3 depicts detection of a RFO cache event, and FIG. 4 depicts detection of a HITM cache event. As depicted in both FIGS. 3 and 4, one or more of the cores 355 incorporates one or more registers 3555. The registers 3555 may include registers supporting arithmetic operations, bitwise logic operations, single-instruction-multiple-data (SIMD) operations, etc. As also depicted, each of the caches 357 and/or 367 incorporates a cache controller 3575 and multiple cache lines 3577 (of which one is depicted). As further depicted, the monitoring unit 354 incorporates a counter 3544 and one or more registers 3545 by which the monitoring unit may be programmed to detect various events and to capture various pieces of information. The monitoring unit 354 may directly communicate with the cache controller 375 of one or more of the caches 357 and/or 367 to detect cache events. Alternatively or additionally, the monitoring unit 354 may intercept communications among the cache controllers 3575 of two or more of the caches 357 and/or 367 to detect cache events.

As still further depicted, the one or more application routines 370 incorporate multiple portions 377 to be concurrently executed, each of which may be assigned a unique identifier (ID) that may be generated by the operating system 340 as threads are allocated to execute each portion 377. Each portion includes a subset of the sequence of instructions of one of the application routines 370 to perform a subset of the one or more functions of that one of the application routines 370. In some embodiments, the application portions 377 that may access the same piece of data (e.g., the data 330) may be portions 377 of the same application routine 370. In such embodiments, those portions 377 should coordinate their accesses to a piece of data with each other. Such coordination may be meant to occur entirely within that one application routine 370 of which both are a part via any of a variety of mechanisms including and not limited to flag bits, passing of parameters in function calls, etc., but a mistake in the writing of one or more of the portions may result in a lack of such coordination. In other embodiments, the application portions 377 that may access the same piece of data may be portions 377 of different ones of the application routines 370 that are related to the extent that they should coordinate their accesses to a piece of data with each other, but again, a mistake may result in a lack of such coordination. In still other embodiments, there may be multiple instances of the same portion 377 of the same application routine 370 that make accesses to the same piece of data, such instances of the same portion 377 should coordinate those accesses.

In preparation for detecting a cache event in either of the embodiments of FIG. 3 or 4, the processor component 350 may be caused by its execution of the detection driver 140 to program one or more of the registers 3545 of the monitoring unit 354 to configure the monitoring unit 354 to detect occurrences of one or more specific cache events. The processor component 350 may also be caused to program one or more of the registers 3545 to respond to detection of those occurrences by capturing aspects of the state of the processor component 350. The processor component 350 may be further caused to program the counter 3544 to cause the monitoring unit 354 to perform such capturing less frequently than upon each of such occurrences. For example, the monitoring unit 354 may be configured, via the counter 3544, to perform such capturing on only every 3rd occurrence of a specified cache event.

Turning to FIG. 3, one of the cores 355 of the processor component 350, in executing one portion 377, executes a read instruction to read the data 330 to load the data 330 into one of the registers 3555. Immediately thereafter, the core 355 of the processor component 350, in executing another portion 377 (of either the same application routine 370 or a different, but related application routine 370) or in executing another instance of the same portion 377, executes a write instruction to write the data 330 with a value from one of the registers 3555 (either the same one of the registers 3555, or a different one) to modify the data 330. Thus, as a result of concurrent execution of two different portions 377, both a read operation and a write operation that both access the same data 330 occur relatively close in time. As has been discussed, this may be an instance of two uncoordinated accesses to the data 330 such that either of the read and write operations may have occurred ahead of the other such that the read operation could retrieve a wrong version of the data 330.

The execution of the read operation may cause the retrieval of the data 330 either from the storage 360 or from another cache (e.g., the cache 367 or another of the caches 357) depending on whether an up-to-date copy of the data 330 is stored in another cache at the time the read operation is executed. Either way, the cache line 3577 of the cache 357 is loaded with the data 330 and the data 330 is also provided to whichever one of the registers 3555 was meant to be loaded with the data 330 by execution of the read operation.

However, the fact of this read operation being followed, either immediately or at least relatively quickly, by a write operation that will modify the same data 330 may trigger the cache controller 3575 of the cache 357 to signal the cache controller 3575 of the other cache 357 or 367 to invalidate whatever copy it may have of the data 330. In response to receiving this signal, the cache controller 3575 of the other cache 357 or 367 invalidates its copy of the data 330 in whichever one of its cache lines 3577 in which that copy may be stored (this invalidation depicted with hash lines). This signal to the other cache 357 or 367 to invalidate whatever copy of the data 330 it may have is a preemptive signal announcing that whatever copy of the data 330 that the other cache 357 or 367 may have will shortly become out of date based on the fact of the write operation that is about to be executed after the read operation.

This combination of the read operation to retrieve the data 330 for storage in the cache 357 and the signal to the other cache 357 or 367 to invalidate whatever copy of the data 330 it may have is what is referred to as a "read for ownership" (RFO) cache event. In essence, the cache 357 is "taking ownership" of the data 330 away from any other caches that may have a copy of the data 330 in preparation for the write operation that will change the data 330, which will result in the cache 357 "owning" the up to date version of what the data 330 will be following the write operation. Use of such a preemptive notice among the caches 357 and/or 367 occurs in at least some implementations of cache coherency mechanisms based on the MESI algorithm, and may be deemed desirable to increase efficiency in maintaining cache coherency. Depending on whether the monitoring unit 354 is in direct communications with the cache controllers 3575 of either the cache 357 or the other cache 357 or 367, the monitoring unit 354 may be signaled by one or both of these cache controllers 3575 of the occurrence of this RFO cache event and/or may intercept the invalidation signal exchanged between them. It should be noted that in some embodiments, the invalidation signal may incorporate an indication of being part of a RFO cache event.

Turning to FIG. 4, one of the cores 355 of the processor component 350, specifically the core designated as core 355*x* in FIG. 4, is caused by its execution of a portion 377 to perform a write operation to modify the data 330, which happens to be stored in one of the cache lines 3577 of the cache 357 associated with the core 355*x*. As a result, the copy of the data 330 in that cache line 3577 is now the up-to-date version of the data 330. Also, in response to this modification of this copy of the data 330, the cache controller 3575 of the cache 357 of the core 355*x* transmits a signal to the cache controllers 3575 of other caches to invalidate whatever copies they may have of the data 330, including others of the caches 357 and/or the cache 367. Among those other controllers 3575 of those other caches is the controller 3575 of the cache 357 of another of the cores 355, specifically the core designated as core 355*y* in FIG. 4. In response to receiving the invalidation signal, the cache controller 3575 of the cache 357 of the core 355*y* invalidates its copy of the data 330 stored in one of its cache lines 3577 (this invalidation depicted with hash lines).

Subsequently, the core 355*y* is caused by its execution of another portion 377 (of either the same application routine 370 or a different, but related application routine 370) or by its execution of another instance of the same portion 377 to perform either a read operation to read the data 330 or a write operation to write to the data 330. Given that the most up-to-date copy of the data 330 is stored in one of the cache lines 3577 of the cache 357 of the core 355*x*, the cache controller 3575 of the cache 357 of the core 355*x* signals the cache controller 3575 of the cache 357 of the core 355*y* to the effect that the cache 357 of the core 355*x* has a modified copy of the data 330 such that this is the most up-to-date copy. Stated differently, this signal conveys the fact that this subsequent read or write operation has resulted in a cache "hit" arising from the cache 357 of the core 355*x* having a copy of the data 330 such that it need not be accessed at the slower storage 360, and this signal conveys the fact that this copy has been modified such that it is the most up-to-date copy. The combination of these two indications in this signal signifies a "hit-modified" or HITM cache event. Thus, a HITM cache event, like the RFO cache event of FIG. 3, arises from a combination of two access operations involving the same data in which one is executed within a relatively short period of time after the other, possibly with one immediately following the other. Again, this may be indicative of an instance of two uncoordinated accesses to the same piece of data caused by the concurrent execution of two different portions 377 of either the same application routine 370 or of different application routines 370. Depending on whether the monitoring unit 354 is in direct communications with the cache controllers 3575 of either the caches 357 of the cores 355*x* or 355*y*, the monitoring unit 354 may be signaled by one or both of these cache controllers 3575 of the occurrence of this HITM cache event and/or may intercept the HITM signal exchanged between them.

Referring back to both FIGS. 3 and 4, the monitoring unit 354 may respond to the occurrence of either of these RFO or HITM cache events by capturing indications of the state of at least a subset of the cores 355 of the processor component 350, and providing those indications to the detection driver 140 as the monitoring data 334. As has been discussed, in executing the detection driver 140, the processor component 350 may filter those indications of the monitoring data 334 to generate the reduced data 337 with fewer of those indications. Again, the reduced data 337 may be conveyed to the debugging routine 170 or may be transmitted to the debugging device 500. Again, such filtering may include removing indications of the state of ones of the cores 355, processes and/or threads not involved in executing a portion 377 of the one or more application routines 370. To enable identification of the cores 355, processes and/or threads that are involved in executing portions 377 of the application routine(s) 370, the processor component 350 may retrieve identifiers for those portions 377, cores 355, processes and/or threads.

Returning to FIG. 1, in embodiments in which the reduced data 337 is provided to the debugging routine 170, the processor component 350 may be caused by its execution of the debugging routine 170 to operate the controls 320 and/or the display 380 to provide a user interface by which information relevant to debugging potentially uncoordinated data accesses may be presented. More specifically, the indications of possible instances of uncoordinated accesses arising from concurrent execution of different portions 377 of either the same application routine 370 or of different, but related, application routines 370 may be visually presented on the display 380. Alternatively or additionally, sequences of instructions from the concurrently executed portions 377 identified as having caused accesses to the same piece of data (e.g., the data 330) relatively close in time, as indicated in the reduced data 337, may be visually presented on the display 380 to enable inspection of those sequences.

Alternatively, in embodiments that include the debugging device and in which the reduced data 337 is provided to the debugging device 500, the debugging device 500 incorporates one or more of a processor component 550, a storage 560, controls 520, a display 580 and an interface 590 to couple the debugging device 500 to the network 999. The storage 560 stores the reduced data 337 and a debugging routine 570. The debugging routine 570 incorporates a sequence of instructions operative on the processor component 550 in its role as a main processor component of the remote computing device 500 to implement logic to perform various functions. Not unlike the debugging routine 170, in executing the debugging routine 570, the processor component 550 may operate the controls 520 and/or the display 580 to provide a user interface by which information relevant to debugging potentially uncoordinated data accesses by portions 377 of the application routine(s) 370 may be presented. Again, alternatively or additionally, indications of possible instances of uncoordinated access arising from concurrent execution of different portions 377 and/or sequences of instructions from those different portions may be visually presented on the display 580.

In embodiments that include the server 100, the computing device 300 may be provided with one or more of the detection driver 140, the configuration data 135 and the debugging routine 170 therefrom, and such provisioning may be performed through the network 999. It should be noted that the debugging routine 170 may be a component of one or more of the application routines 370 such that the debugging routine 170 may be provided to the computing device 300 along with or as part of one or more of the application routines 370.

Figure 2:
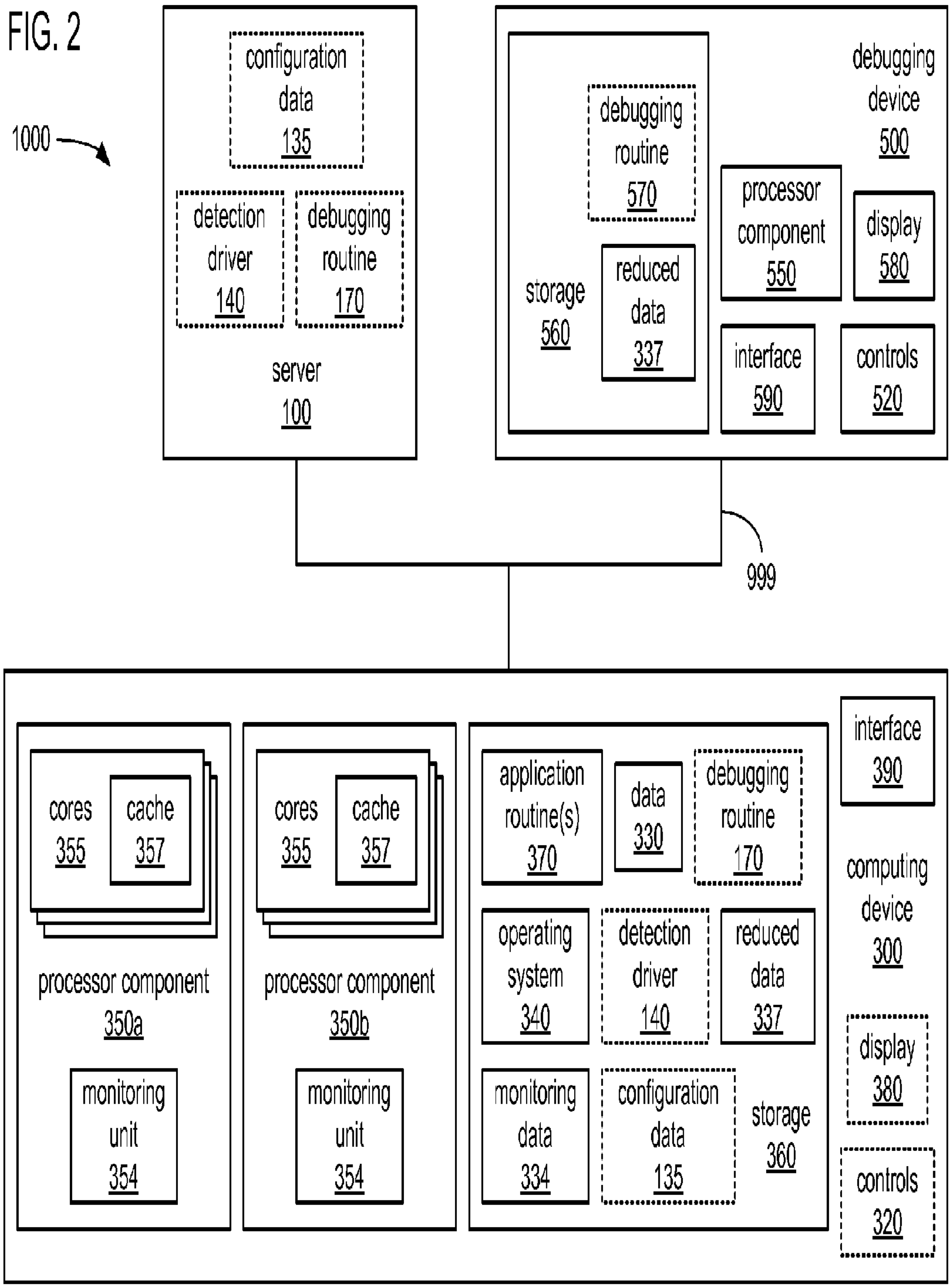
FIG. 2 illustrates an alternate embodiment of a race condition debugging system.

FIG. 2 illustrates a block diagram of an alternate embodiment of the race condition debugging system 1000 that includes an alternate embodiment of the computing device 300. The alternate embodiment of the race condition debugging system 1000 of FIG. 2 is similar to the embodiment of FIG. 1 in many ways, and thus, like reference numerals are used to refer to like components throughout. However, unlike the computing device 300 of FIG. 1, the computing device 300 of FIG. 2 incorporates more than one of the processor components 350, designated in FIG. 2 as processor components 350*a* and 350*b* that may each execute a portion of the same application routine 370 or of different, but related, application routines 370. Thus, the race conditions in accesses to the same piece of data by different portions of one or more application routines 370 may involve races between accesses made by different ones of the processor components 350*a* and 350*b*.

To accommodate this, execution of the detection driver 140 by one or both of the processor components 350*a* and 350*b* may cause the monitoring units 354 of both of these processor components to be configured to monitor for specific cache events and to capture aspects of the state of their respective ones of these processor components. Thus, both of the depicted monitoring units 354 may contribute to the contents of the monitoring data 334. Further, the detection driver 140 may collate the indications of the state of each of the processor components 350*a* and 350*b* into a combined set of indications in generating the reduced data 337. By way of example, the detection driver 140 may filter out redundant information in the indications in the monitoring data 334 received from each of the monitoring units 354.

In various embodiments, each of the processor components 350 and 550 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, each of the storages 360 and 560 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 390 and 590 may employ any of a wide variety of signaling technologies enabling computing devices to be coupled to other devices as has been described. Each of these interfaces may include circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 5:
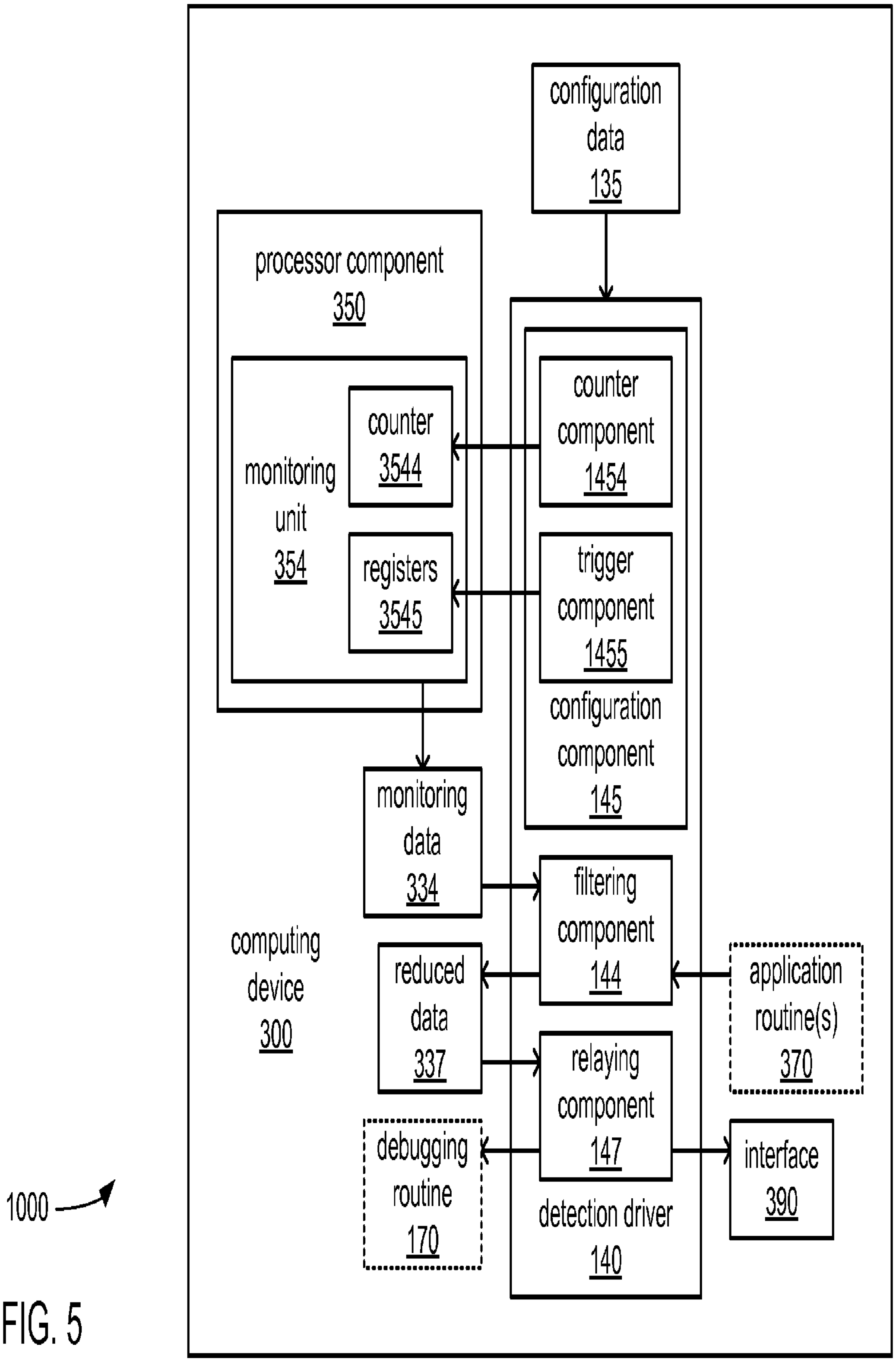
FIGS. 5-6 each illustrate a portion of an embodiment of a race condition debugging system.
Figure 6:
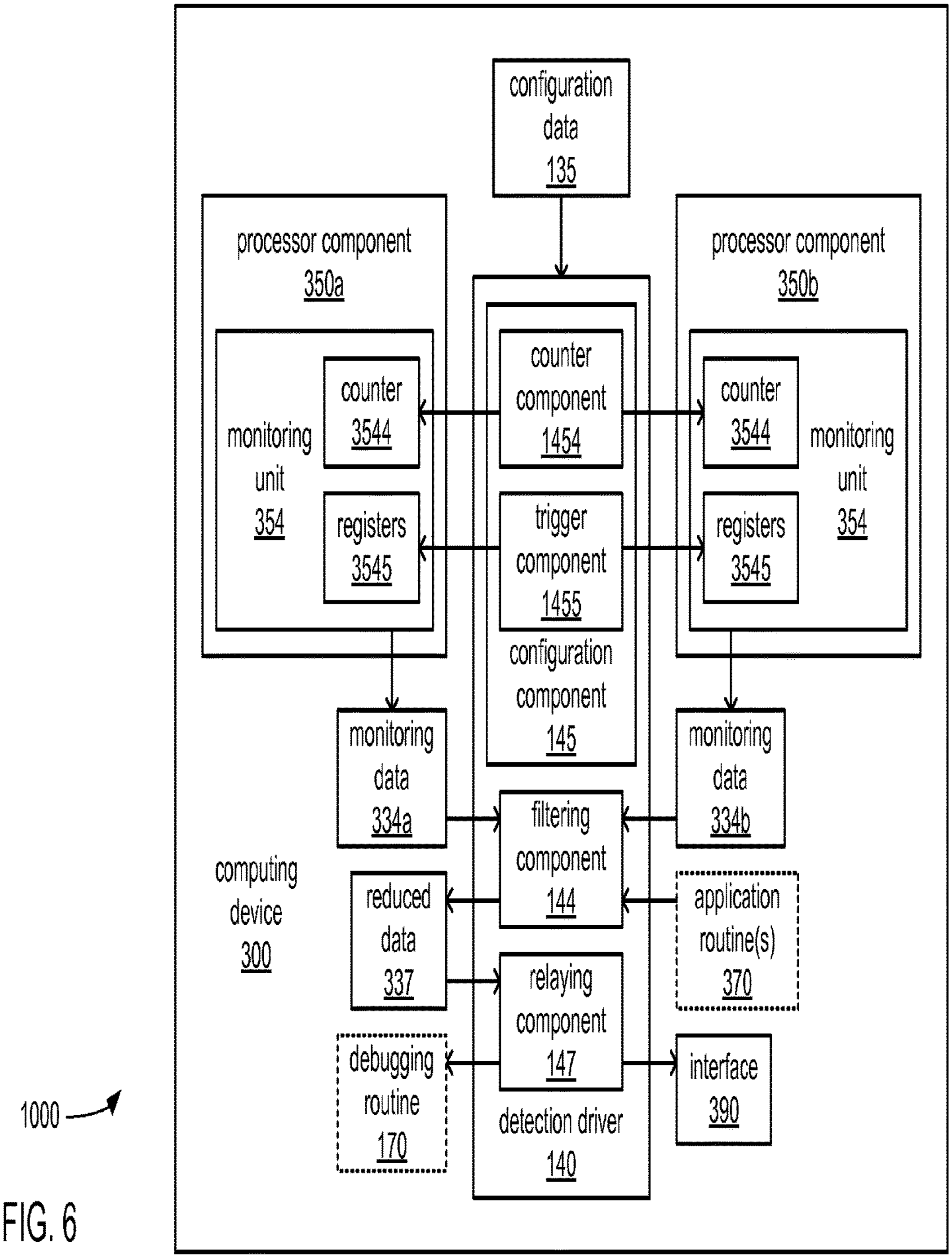

FIG. 5 illustrates a block diagram of a portion of an embodiment of the race condition debugging system 1000 of FIG. 1 in greater detail. More specifically, FIG. 5 depicts aspects of the operating environment of the computing device 300 in which the processor component 350, in executing at least the detection driver 140, detects cache events that may be associated with a race condition between two accesses to the same piece of data. FIG. 6 illustrates a block diagram of a portion of an embodiment of the race condition debugging system 1000 of FIG. 2 in greater detail. More specifically, FIG. 6 depicts aspects of the operating environment of the computing device 300 in which either of the processor components 350*a* or 350*b*, in executing at least the detection driver 140, detects cache events that may be associated with a race condition between two accesses to the same piece of data.

Referring to both FIGS. 5 and 6, as recognizable to those skilled in the art, the operating system 340, the application routine(s) 370, the detection driver 140 and the debugging routine 170, including the components of which each is composed, are selected to be operative on whatever type of processor or processors that are selected to implement applicable ones of the processor components 350, 350*a* or 350*b*. In various embodiments, the sequences of instructions making up each may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 350, 350*a* or 350*b*. Where one or more device drivers are included, those device drivers may provide support for any of a variety of other components, whether hardware or software components, of the computing device 300.

The detection driver 140 may include a configuration component 145 executable by the processor component 350 or by the processor components 350*a* and/or 350*b* to configure one or more of the monitoring units 354 to detect one or more specific cache events (e.g., RFO, HITM, etc.) associated with race conditions between accesses to the same piece of data (e.g., the data 330). More specifically, a trigger component 1455 of the configuration component 145 programs one or more of the registers 3545 of one or more of the monitoring units to specify one or more particular cache events to respond to by capturing various aspects of the state of the processor component 350 or of the processor components 350*a* and/or 350*b*. The configuration component 145 may retrieve indications of what those particular cache events are from the configuration data 135. The registers 3545 may enable the select of which aspects of the state of the processor component 350 or of the processor components 350*a* and/or 350*b* are to be captured. Further, the registers 3545 may enable some control over the manner in which the monitoring data 334 (or alternatively monitoring data 334*a* and 334*b*, as depicted in FIG. 6) generated by the monitoring unit(s) 354 is provided.

A counter component 1454 of the configuration component 145 may program the counter 3544 of the monitoring unit(s) 354 to capture the state of the processor component 350 or of the processor components 350*a* and/or 350*b* at a specified interval of occurrences of a specified cache event (e.g., every "Nth" occurrence) to reduce the frequency at which such captures are performed. In embodiments in which there is more than one of the processor components 350 (e.g., the processor components 350*a* and 350*b* of FIG. 6), the configuration component 145 may program the monitoring units 354 of each of the processor components to coordinate the capturing of cache events at the same frequency and/or for the same occurrences of a cache event.

The trigger component 1455 may also operate one or more of the registers 3545 of one or more of the monitoring units 354 to dynamically enable and/or disable detection of the one or more specific cache events. The configuration component 145 may do so in response to indications received from the operating system 340, the debugging routine 170, and/or at least one of the application routines 370 of when the at least one of the application routines 370 is being executed.

The detection driver 140 may include a filtering component 144 executable by the processor component 350 or by the processor components 350*a* and/or 350*b* to receive the monitoring data 334 or the monitoring data 334*a* and 334*b* from the monitoring unit(s) 354. Upon receipt of the monitoring data 334 or the monitoring data 334*a-b*, the filtering component 144 parses the indications of the status of the processor component 350 or the processor components 350*a* and/or 350*b* to generate the reduced data 337 with a subset of those indications that are deemed germane to identifying what portions 377 of one or more of the application routines 370 may be involved in a race condition in accessing the same piece of data. In so doing, the filtering component 144 may do so by comparing addresses of routines and/or data associated with cache events to one or more known addresses or ranges of addresses either of portions 377 of one or more of the application routines 370 believed to be responsible for such race conditions or of the data being accessed amidst such race conditions. In embodiments in which there is more than one of the processor components 350 (e.g., the processor components 350*a* and 350*b* of FIG. 6), the filtering component may eliminate redundant information in the indications of the state of those processor components in generating the reduced data 337.

The filtering component 144 may also remove indications of the state of ones of the cores 355, processes and/or threads not involved in executing any portion 377 of one or more of the application routines 370 believed to be responsible for such race conditions. To enable this, the filtering component 144 may retrieve identifiers of the cores 355, processes and/or threads that are involved in executing portions 377 of the one or more application routines 370. The filtering component 144 may compare such identifiers to similar identifiers included in the indications to distinguish indications associated with a cache event arising from a race condition between accesses made by different portions 377 of the application routine(s) 370, from indications associated with other cache events. In various embodiments, depending on the architecture of the operating system 340 and/or other factors, the filtering component 144 may receive such identifiers directly from the application routine(s) 370 (e.g., as a result of one or more of the application routines 370 operating in a "debug mode"), from the debugging routine 170, or from the operating system 340. The debugging routine 170 may retrieve such identifiers from the application routine(s) 370 or the operating system 340 before relaying them to the filtering component 144.

The detection driver 140 may include a relaying component 147 executable by the processor component 350 or by the processor components 350*a* and/or 350*b* to relay the reduced data 337 to a debugging routine executed within one or both of the computing device 300 or another computing device (e.g., the debugging device 500). In relaying the reduced data 337 to a debugging routine executed within the computing device 300 (e.g., the debugging routine 170), the relaying component 147 may so relay the reduced data 337 through the operating system 340. This may be necessitated in embodiments in which the detection driver 140 is executed as a device driver at a lower level similar to the operating system 340 such that the operating system provides a layer of abstraction between device drivers and other routines, such as the debugging routine 170. In relaying the reduced data 337 to a debugging routine executed within another computing device, the relaying component 147 may employ the interface 390 to transmit the reduced data 337 to another computing device (e.g., the debugging device 500) via a network (e.g., the network 999).

Figure 7:
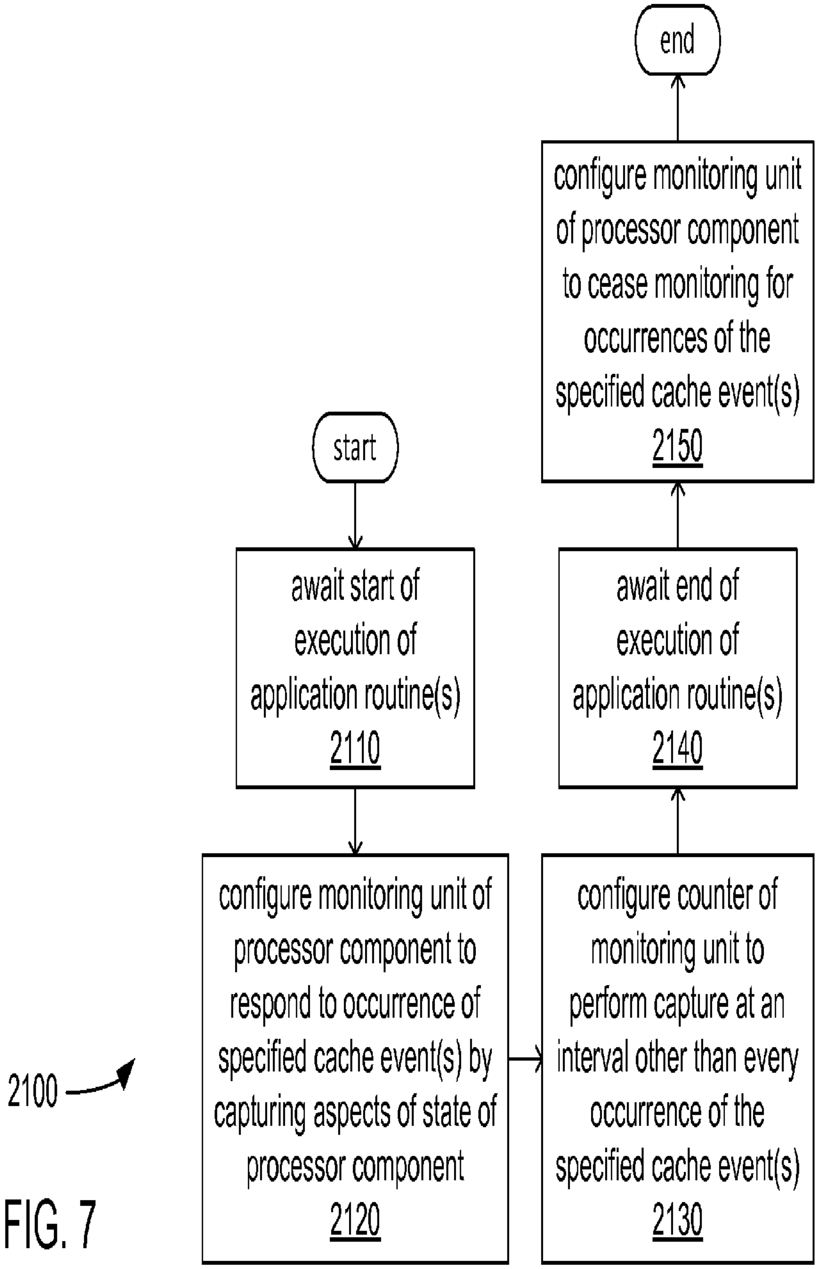
FIGS. 7-9 each illustrate a logic flow according to an embodiment.

FIG. 7 illustrates one embodiment of a logic flow 2100. The logic flow 2100 may be representative of some or all of the operations executed by one or more embodiments described herein. More specifically, the logic flow 2100 may illustrate operations performed by the processor component 350 or the processor components 350*a* and/or 350*b* in executing at least the detection driver 140, and/or performed by other component(s) of the computing device 300.

At 2110, a processor component of a computing device of a race condition debugging system (e.g., the processor component 350 or the processor component 350*a* and/or 350*b* of the computing device 300 of the race condition debugging system 1000) awaits an indication of the start of execution of one or more application routines (e.g., the application routine(s) 370). As has been discussed, such an indication may be conveyed directly from the one or more application routines, through an operating system (e.g., the operating system 340) or from a debugging routine (e.g., the debugging routine 170).

At 2120, a monitoring unit (e.g., the monitoring unit 354) of a processor component that executes at least one portion of the application routine(s) is configured to detect occurrences of specific cache event(s) associated with race conditions between accesses to the same piece of data (e.g., RFO, HITM, etc.), and to respond to those occurrences by capturing indications of the state of a processor component that executes one or more application routines. One or more of the processors that executes at least a portion of the application routine(s) may or may not be the same processor component that configures the monitoring unit. As previously discussed, the accesses may be a combination of a read operation and a write operation or may be a combination of multiple write operations. Regardless, the accesses may be made by different portions of a single application routine, portions of two different application routines, or two instances of the same portion of the same application routine that have failed to coordinate these accesses, even though they are meant to do so (e.g., portions 377 of either a single application routine 370 or of different ones of the application routines 370, or a single portion 377 of a single application routine 370). As also previously discussed, the captured indications may include an indicator of the type of cache event that occurred, an indicator of the type of data access (e.g., a read operation or a write operation) that triggered the cache event, an identifier of a process and/or thread of execution that caused the data access, an indication of an address of an instruction pointer, the contents of one or more registers of the processor component, etc.

At 2130, a counter of the monitoring unit is configured to perform such captures at an interval of occurrences of the cache event(s) other than every occurrence. As has been discussed, such an interval may be every "Nth" occurrence of the cache event(s), such as every 3rd occurrence, every 5th occurrence, etc.

At 2140, the end of the execution of the one or more application routines is awaited. At 2150, the end of execution of the application routine(s) is responded to by configuring the monitoring unit to cease monitoring for occurrences of the cache event(s). In this way, the monitoring for occurrences of the cache events and accompanying capture operations may be dynamically enabled and disabled depending on whether the application routine(s) are currently being executed.

Figure 8:
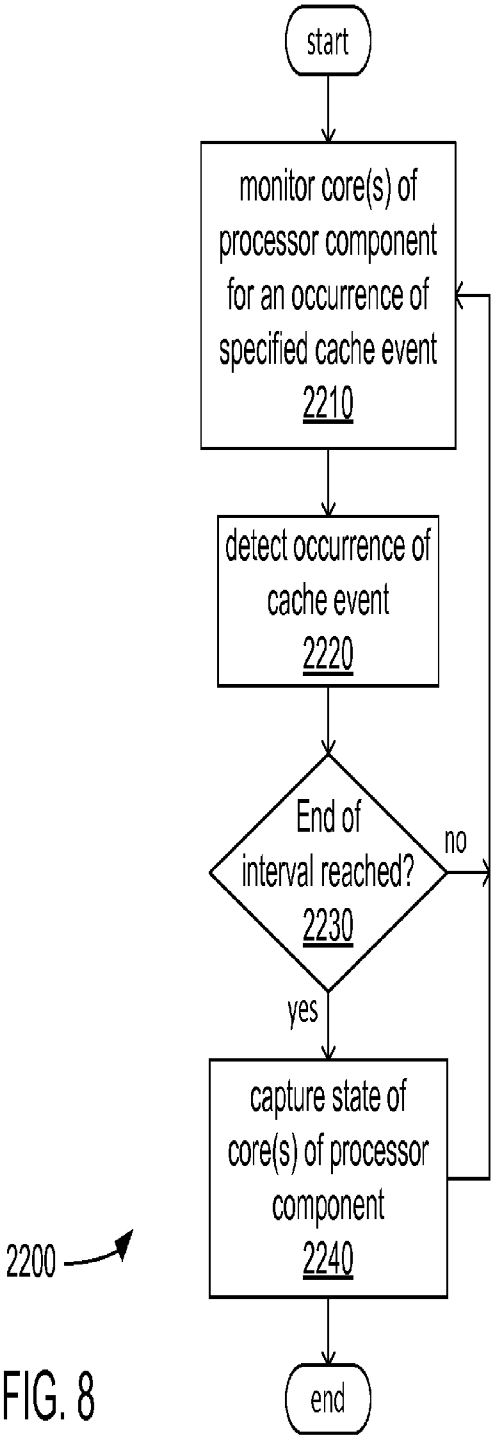

FIG. 8 illustrates one embodiment of a logic flow 2200. The logic flow 2200 may be representative of some or all of the operations executed by one or more embodiments described herein. More specifically, the logic flow 2200 may illustrate operations performed by the processor component 350 or the processor components 350*a* and/or 350*b* in executing at least the detection driver 140, and/or performed by other component(s) of the computing device 300.

At 2210, a monitoring unit of a processor component of a computing device of a race condition debugging system (e.g., the monitoring unit 354 of the processor component 350 or the processor components 350*a* and/or 350*b* of the computing device 300 of the race condition debugging system 1000) monitors one or more cores (e.g., one or more of the cores 355 or one or both of the cores 355*x* and 355*y*) of a processor component executing at least a portion of at least one application routine (e.g., one of the portions 377 of one of the application routines 370) for an occurrence of a specified cache event. As has been discussed, the monitoring unit is configured to monitor for one or more specific cache events associated with race conditions between accesses to the same piece of data, such as a race condition between a read operation and a write operation or between two write operations involving the same piece of data.

At 2220, an occurrence of the specified event is detected. At 2230, a check is made to determine whether the end of an interval programmed into a counter of the monitoring unit (e.g., the counter 3544) has been reached. If the end of the interval has not been reached, then the one or more cores of the processor component executing at least a portion of the application routine are again monitored at 2210.

However, if the end of the interval has been reached, then the state of the one or more cores of the processor component executing at least one portion of at least one application routine is captured at 2240. As has been discussed, such capturing may entail capturing the state of one or more of the registers of one or more of the cores (e.g., the registers 3555) and/or an address pointed to by an instruction pointer of one or more of the cores. Following such a capture, the monitoring of the one or more cores continues at 2210.

Figure 9:
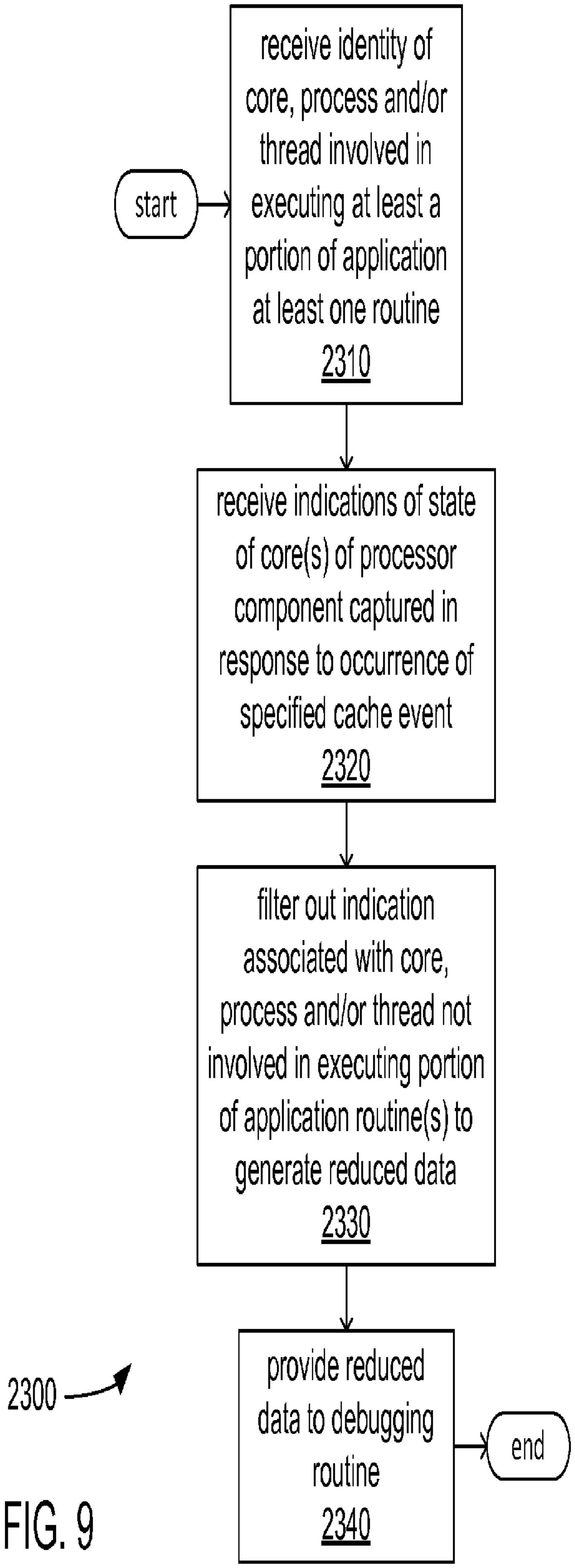

FIG. 9 illustrates one embodiment of a logic flow 2300. The logic flow 2300 may be representative of some or all of the operations executed by one or more embodiments described herein. More specifically, the logic flow 2300 may illustrate operations performed by the processor component 350 or the processor components 350*a* and/or 350*b* in executing at least the detection driver 140, and/or performed by other component(s) of the computing device 300.

At 2310, a processor component of a computing device of a race condition debugging system (e.g., the processor component 350 or the processor component 350*a* and/or 350*b* of the computing device 300 of the race condition debugging system 1000) receives indications of the identity of at least one core (e.g., one of the cores 355), process and/or thread involved in executing at least one portion of at least one application routine (e.g., a portion 377 of one of the application routines 370). As has been discussed, such an indication may be conveyed directly from the application routine(s), through an operating system (e.g., the operating system 340) or from a debugging routine (e.g., the debugging routine 170).

At 2320, indications of the state of one or more cores of a processor component that were captured in response to an occurrence of a specified cache event are received. As has been discussed, the specified cache event may be a type of cache event associated with occurrences of race conditions in accessing the same piece of memory between two portions of a single application routine or between portions of two different (but related) application routines. The accesses between which a race condition may exist may be a combination of a read operation and a write operation, or may be a combination of two or more write operations.

At 2330, indications associated with one or more cores, processes and/or threads not involved in executing any portion of the application routine(s) are filtered out to generate reduced data. Such filtering employs the indications of identity of the one or more cores, processes and/or threads that are involved in executing at least one portion of the application(s).

At 2340, the reduced data generated, at least in part, by the above filtering is provided to a debugging routine. As has been discussed, the debugging routine may be executed within the same computing device in which the application routine(s) are executed, and the reduced data may be provided to the debugging routine through an operating system of that computing device. Otherwise, the reduced data may be transmitted via network to another computing device on which a debugging routine is executed.

Figure 10:
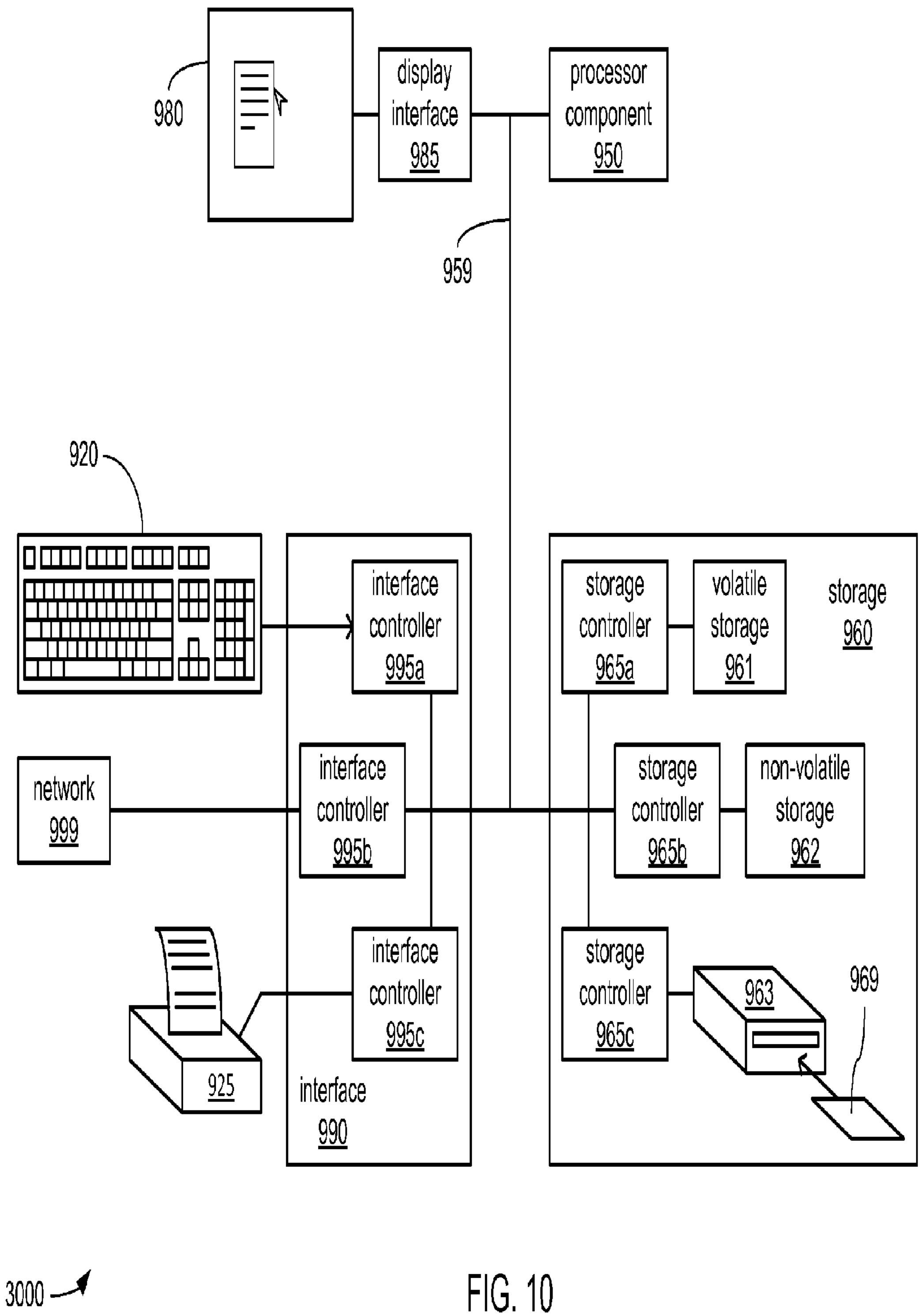
FIG. 10 illustrates a processing architecture according to an embodiment.

FIG. 10 illustrates an embodiment of a processing architecture 3000 suitable for implementing various embodiments as previously described. More specifically, the processing architecture 3000 (or variants thereof) may be implemented as part of one or more of the computing devices 100, 300 or 500. It should be noted that components of the processing architecture 3000 are given reference numbers in which the last two digits correspond to the last two digits of reference numbers of at least some of the components earlier depicted and described as part of these computing devices. This is done as an aid to correlating components of each.

The processing architecture 3000 may include various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device may include at least a processor component 950, a storage 960, an interface 990 to one or more other devices, and a coupling 959. As will be explained, depending on various aspects of a computing device implementing the processing architecture 3000, including its intended use and/or conditions of use, such a computing device may further include additional components, such as without limitation, a display interface 985, or one or more processing subsystems 900. In whatever computing device may implement the processing architecture 3000, one of the various depicted components that are implemented with circuitry may be implemented with discrete components and/or as blocks of circuitry within a single or relatively small number of semiconductor devices (e.g., a "system on a chip" or SOC).

The coupling 959 may include one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to one or more of the processor components 350 or 550) may include any of a wide variety of commercially available processors, employing any of a wide variety of technologies and implemented with one or more cores physically combined in any of a number of ways.

As previously discussed, the storage 960 (corresponding to one or more of the storages 360 or 560) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965*a* providing an appropriate interface to the volatile storage 961 that perhaps employs row and column addressing, and where the storage controller 965*a* may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965*b* providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965*c* providing an appropriate interface to the removable media storage 963 that perhaps employs addressing of blocks of information, and where the storage controller 965*c* may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 to implement various embodiments may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 to implement various embodiments may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (corresponding to one or more of the interfaces 390 or 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995*a*, 995*b* and 995*c*. The interface controller 995*a* may employ any of a variety of types of wired digital serial interface or radio frequency wireless interface to receive serially transmitted messages from user input devices, such as the depicted keyboard 920. The interface controller 995*b* may employ any of a variety of cabling-based or wireless signaling, timings and/or protocols to access other computing devices through the depicted network 999 (perhaps a network made up of one or more links, smaller networks, or perhaps the Internet). The interface 995*c* may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to the display 580), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus to detect race conditions includes a processor component that includes a monitoring unit, a trigger component for execution by the processor component to configure the monitoring unit to detect a cache event associated with a race condition between accesses to a piece of data and to capture an indication of a state of the processor component to generate monitoring data in response to an occurrence of the cache event, and a counter component for execution by the processor component to configure a counter of the monitoring unit to enable capture of the indication of the state of the processor component at a frequency less than every occurrence of the cache event.

In Example 2, which includes the subject matter of Example 1, the trigger component may dynamically enable the capture of the indication based on whether an application routine that includes multiple portions for concurrent execution by the processor component is currently executed by the processor component.

In Example 3, which includes the subject matter of any of Examples 1-2, the apparatus may include a filter component for execution by the processor component to remove the indication from the monitoring data based on the cache event not arising from a race condition between a first access to the piece of data by a first portion of an application routine executed by the processor component and a second access to the piece of data by a second portion of the application routine to generate a reduced data that includes a subset of multiple indications of the state of the processor component of the monitoring data, the first access may include a write operation and the second access may include one of a read operation and a write operation.

In Example 4, which includes the subject matter of any of Examples 1-3, the filter component may determine whether the cache event arises from a race condition between the first and second accesses based on an identifier of at least one of the first portion, the second portion, a core of the processor component that executes one of the first and second portions, or a thread of execution of one of the first and second portions.

In Example 5, which includes the subject matter of any of Examples 1-4, the apparatus may include an interface to couple the processor component to a network, and a relaying component for execution by the processor component to operate the interface to transmit the reduced data to a debugging device.

In Example 6, which includes the subject matter of any of Examples 1-5, the race condition including a race condition between a read operation of a first application routine executed by the processor component in a first thread of execution to read the piece of data, and a write operation of a second application routine executed by the processor component in a second thread of execution to write to the piece of data.

In Example 7, which includes the subject matter of any of Examples 1-6, the indication may include at least one of contents of a register of the processor component, an address of an instruction pointer of the processor component, an indication of what access operation triggered the cache event, a type of the cache event, an identifier of a core of the processor that executed an access operation that triggered the cache event, or an identifier of a thread of execution on which an access operation that triggered the cache event was executed.

In Example 8, which includes the subject matter of any of Examples 1-7, the cache event may involve a cache of the processor component and may include at least one of a read-for-ownership (RFO) cache event or a hit-modified (HITM) cache event.

In Example 9, which includes the subject matter of any of Examples 1-8, the apparatus may include another processor component, the trigger component to configure a monitoring unit of the other processor component to detect the cache event and to capture an indication of a state of the other processor component as another monitoring data in response to an occurrence of the cache event.

In Example 10, which includes the subject matter of any of Examples 1-9, the filter component may remove the indication of the state of the other processor component from the other monitoring data based on the cache event not arising from a race condition between a read operation of a first portion of an application routine and a write operation of a second portion of the application routine to generate a reduced data that includes a subset of multiple indications of the state of the processor component of the monitoring data and a subset of multiple indications of the state of the other processor component of the other monitoring data.

In Example 11, an apparatus to detect race conditions may include a first processor component; a second processor component; a trigger component to configure a monitoring unit of the first processor component to detect a cache event associated with a race condition between accesses to a piece of data and to capture a first indication of a state of the first processor component as a first monitoring data in response to an occurrence of the cache event, and to configure a monitoring unit of the second processor component to detect the cache event and to capture a second indication of a state of the second processor component as a second monitoring data in response to an occurrence of the cache event; and a filter component to compare the first and second indications and to generate a reduced data that includes the first indication and not the second indication based on redundancy of the second indication to the first indication.

In Example 12, which includes the subject matter of Example 11, the trigger component may dynamically enable the capture of the first indication and the second indication based on whether an application routine that includes multiple portions for concurrent execution by at least one of the first processor component and the second processor component is currently executed by at least one of the first processor component and the second processor component.

In Example 13, which includes the subject matter of any of Examples 11-12, the apparatus may include a counter component to configure a counter of the monitoring unit of each of the first and second processor components to enable the capture of the first indication and the second indication at a frequency less than every occurrence of the cache event.

In Example 14, which includes the subject matter of any of Examples 11-13, the counter component may configure the counter of the monitoring unit of the first processor component and the counter of the monitoring unit of the second processor component to synchronize the capture of the first indication and the capture of the second indication.

In Example 15, which includes the subject matter of any of Examples 11-14, the filter component may condition including at least one of the first indication and the second indication in the reduced data based on the cache event not arising from a race condition between an access to the piece of data by a first portion of an application routine executed by one of the first and second processor components and an access to the piece of data by a second portion of the application routine executed by one of the first and second processor components.

In Example 16, which includes the subject matter of any of Examples 11-15, the filter component may determine whether the cache event arises from a race condition between the first and second portions of the application routine based on an identifier of at least one of the first portion, the second portion, a core of the first processor component that executes one of the first and second portions, a core of the second processor component that executes one of the first and second portions, or a thread of execution of one of the first and second portions.

In Example 17, which includes the subject matter of any of Examples 11-16, the apparatus may include an interface to couple at least one of the first processor component and the second processor component to a network, and a relaying component to operate the interface to transmit the reduced data to a debugging device.

In Example 18, which includes the subject matter of any of Examples 11-17, the race condition may include a race condition between a read operation of a first portion of an application routine executed by one of the first and second processor components in a first thread of execution to read the piece of data, and a write operation of a second portion of the application routine executed by one of the first and second processor components in a second thread of execution to write to the piece of data.

In Example 19, which includes the subject matter of any of Examples 11-18, the first indication may include at least one of contents of a register of the first processor component, an address of an instruction pointer of the first processor component, an indication of what access operation triggered the cache event, a type of the cache event, an identifier of a core of the first processor that executed an access operation that triggered the cache event, or an identifier of a thread of execution on which an access operation that triggered the cache event was executed.

In Example 20, which includes the subject matter of any of Examples 11-19, the cache event may involve at least one of a first cache of the first processor component or a second cache of the second processor component, and the cache event may include at least one of a read-for-ownership (RFO) cache event or a hit-modified (HITM) cache event.

In Example 21, a computing-implemented method for detecting race conditions may include detecting a cache event associated with a race condition between accesses to a piece of data by at least one application routine executed by a processor component, and recurringly capturing an indication of a state of the processor component as monitoring data in response to an occurrence of the cache event at a selected interval of multiple occurrences of the cache event.

In Example 22, which includes the subject matter of Example 21, the method may include dynamically enabling capture of the indication based on whether the application routine is currently at least partly executed by the processor component.

In Example 23, which includes the subject matter of any of Examples 21-22, the method may include removing the indication from the monitoring data based on the cache event not arising from a race condition between a read operation of a first portion of the application routine and a write operation of a second portion of the application routine to generate a reduced data that includes a subset of multiple indications of the state of the processor component of the monitoring data.

In Example 24, which includes the subject matter of any of Examples 21-23, the method may include determining whether the cache event arises from a race condition between the read operation and the write operation based on an identifier of at least one of the first portion, the second portion, a core of the processor component that executes one of the first and second portions, or a thread of execution of one of the first and second portions.

In Example 25, which includes the subject matter of any of Examples 21-24, the method may include transmitting the reduced data to a debugging device via a network.

In Example 26, which includes the subject matter of any of Examples 21-25, the race condition may include a race condition between a first write operation of the application routine executed by the processor component in a first thread of execution to write to the piece of data, and a second write operation of another application routine executed by the processor component in a second thread of execution to write to the piece of data.

In Example 27, which includes the subject matter of any of Examples 21-26, the indication may include at least one of contents of a register of the processor component, an address of an instruction pointer of the processor component, an indication of what access operation triggered the cache event, a type of the cache event, an identifier of a core of the processor that executed an access operation that triggered the cache event, or an identifier of a thread of execution on which an access operation that triggered the cache event was executed.

In Example 28, which includes the subject matter of any of Examples 21-27, the cache event may involve a cache of the processor component and may include at least one of a read-for-ownership (RFO) cache event or a hit-modified (HITM) cache event.

In Example 29, which includes the subject matter of any of Examples 21-28, the method may include capturing an indication of a state of another processor component as another monitoring data in response to the occurrence of the cache event at the selected interval of multiple occurrences of the cache event.

In Example 30, which includes the subject matter of any of Examples 21-29, the method may include removing the indication of the state of the other processor component from the other monitoring data based on the cache event not arising from a race condition between a first access to the piece of data by a first portion of the application routine and a second access to the piece of data by a second portion of the application routine to generate a reduced data that includes a subset of multiple indications of the state of the processor component of the monitoring data and a subset of multiple indications of the state of the other processor component of the other monitoring data.

In Example 31, at least one machine-readable storage medium includes instructions that when executed by a processor component, cause the processor component device to detect a cache event associated with a race condition between accesses to a piece of data by at least one application routine executed by the processor component, and recurringly capture an indication of a state of the processor component as monitoring data in response to an occurrence of the cache event at a selected interval of multiple occurrences of the cache event.

In Example 32, which includes the subject matter of Example 31, the processor component may be caused to dynamically enable the capture of the indication based on whether the application routine is currently at least partly executed by the processor component.

In Example 33, which includes the subject matter of any of Examples 31-32, the processor component may be caused to remove the indication from the monitoring data based on the cache event not arising from a race condition between a first write operation of a first portion of the application routine and a second write operation of a second portion of the application routine to generate a reduced data that includes a subset of multiple indications of the state of the processor component of the monitoring data.

In Example 34, which includes the subject matter of any of Examples 31-33, the processor component may be caused to determine whether the cache event arises from a race condition between the first and second write operations based on an identifier of at least one of the first portion, the second portion, a core of the processor component that executes one of the first and second portions, or a thread of execution of one of the first and second portions.

In Example 35, which includes the subject matter of any of Examples 31-34, the processor component may be caused to transmit the reduced data to a debugging device via a network.

In Example 36, which includes the subject matter of any of Examples 31-35, the race condition may include a race condition between a read operation of the application routine executed by the processor component in a first thread of execution to read the piece of data, and a write operation of another application routine executed by the processor component in a second thread of execution to write to the piece of data.

In Example 37, which includes the subject matter of any of Examples 31-36, the indication may include at least one of contents of a register of the processor component, an address of an instruction pointer of the processor component, an indication of what access operation triggered the cache event, a type of the cache event, an identifier of a core of the processor that executed an access operation that triggered the cache event, or an identifier of a thread of execution on which an access operation that triggered the cache event was executed.

In Example 38, which includes the subject matter of any of Examples 31-37, the cache event may involve a cache of the processor component and may include at least one of a read-for-ownership (RFO) cache event or a hit-modified (HITM) cache event.

In Example 39, which includes the subject matter of any of Examples 31-38, the processor component may be caused to capture an indication of a state of another processor component as another monitoring data in response to the occurrence of the cache event at the selected interval of multiple occurrences of the cache event.

In Example 40, which includes the subject matter of any of Examples 31-39, the processor component may be caused to remove the indication of the state of the other processor component from the other monitoring data based on the cache event not arising from a race condition between a first access to the piece of data by a first portion of the application routine and a second access to the piece of data by a second portion of the application routine to generate a reduced data that includes a subset of multiple indications of the state of the processor component of the monitoring data and a subset of multiple indications of the state of the other processor component of the other monitoring data.

In Example 41, an apparatus to receive commands includes means for detecting a cache event associated with a race condition between accesses to a piece of data by at least one application routine executed by a processor component, and recurringly capturing an indication of a state of the processor component as monitoring data in response to an occurrence of the cache event at a selected interval of multiple occurrences of the cache event.

In Example 42, which includes the subject matter of Example 41, the apparatus may include means for dynamically enabling capture of the indication based on whether the application routine is currently at least partly executed by the processor component.

In Example 43, which includes the subject matter of any of Examples 41-42, the apparatus may include means for removing the indication from the monitoring data based on the cache event not arising from a race condition between a read operation of a first portion of the application routine and a write operation of a second portion of the application routine to generate a reduced data that includes a subset of multiple indications of the state of the processor component of the monitoring data.

In Example 44, which includes the subject matter of any of Examples 41-43, the apparatus may include means for determining whether the cache event arises from a race condition between the read operation and the write operation based on an identifier of at least one of the first portion, the second portion, a core of the processor component that executes one of the first and second portions, or a thread of execution of one of the first and second portions.

In Example 45, which includes the subject matter of any of Examples 41-44, the apparatus may include means for transmitting the reduced data to a debugging device via a network.

In Example 46, which includes the subject matter of any of Examples 41-45, the race condition may include a race condition between a first write operation of the application routine executed by the processor component in a first thread of execution to write to the piece of data, and a second write operation of another application routine executed by the processor component in a second thread of execution to write to the piece of data.

In Example 47, which includes the subject matter of any of Examples 41-46, the indication may include at least one of contents of a register of the processor component, an address of an instruction pointer of the processor component, an indication of what access operation triggered the cache event, a type of the cache event, an identifier of a core of the processor that executed an access operation that triggered the cache event, or an identifier of a thread of execution on which an access operation that triggered the cache event was executed.

In Example 48, which includes the subject matter of any of Examples 41-47, the cache event may involve a cache of the processor component and may include at least one of a read-for-ownership (RFO) cache event or a hit-modified (HITM) cache event.

In Example 49, which includes the subject matter of any of Examples 41-48, the apparatus may include means for capturing an indication of a state of another processor component as another monitoring data in response to the occurrence of the cache event at the selected interval of multiple occurrences of the cache event.

In Example 50, which includes the subject matter of any of Examples 41-49, the apparatus may include means for removing the indication of the state of the other processor component from the other monitoring data based on the cache event not arising from a race condition between a first access to the piece of data by a first portion of the application routine and a second access to the piece of data by a second portion of the application routine to generate a reduced data that includes a subset of multiple indications of the state of the processor component of the monitoring data and a subset of multiple indications of the state of the other processor component of the other monitoring data.

In Example 51, at least one machine-readable storage medium may include instructions that when executed by a processor component, cause the processor component to perform any of the above.

In Example 52, an apparatus detect race conditions may include means for performing any of the above.

The invention claimed is:

1. A computer-implemented method for detecting race conditions comprising:

detecting a cache event associated with a race condition between accesses to a piece of data by at least one application routine executed by a processor component, the cache event comprising a read-for-ownership (RFO) cache event or a hit-modified (HITM) cache event based on a cache coherency mechanism;

recurringly capturing an indication of a state of the processor component as monitoring data in response to an occurrence of the cache event at a selected interval of multiple occurrences of the cache event, each instance of the indication of the state comprising an address of an instruction pointer of the processor component and a type of the cache event indicating whether the cache event is a RFO cache event or a HITM cache event;

determining whether the race condition is a read operation of a first portion of the application routine and a write operation of a second portion of the at least one application routine based on an identifier of at least one of the first portion, the second portion, a core of the processor component that executes one of the first and second portions, or a thread of execution of one of the first and second portions; and removing the indication from the monitoring data based on the cache event not arising from the race condition between the read operation of the first portion of the application routine and the write operation of a second portion of the application routine to generate a reduced data comprising a subset of multiple indications of the state of the processor component of the monitoring data.

2. The computer-implemented method of claim 1, comprising transmitting the reduced data to a debugging device via a network.

3. The computer-implemented method of claim 1, the race condition comprising a race condition between a first write operation of the application routine executed by the processor component in a first thread of execution to write to the piece of data, and a second write operation of another application routine executed by the processor component in a second thread of execution to write to the piece of data.

4. The computer-implemented method of claim 1, wherein each instance of the indication of the state comprises an identifier of a core to enable debugging.

5. An apparatus to detect race conditions comprising:

a hardware processor component, comprising a monitoring unit;

a trigger component stored in a memory which when executed by the processor component causes the monitoring unit to detect a cache event arising from a race condition between accesses to a piece of data and to capture an indication of a state of the processor component to generate monitoring data in response to an occurrence of the cache event, the cache event comprising a read-for-ownership (RFO) cache event or a hit-modified (HITM) cache event based on a cache coherency mechanism, and the indication of the state comprising an address of an instruction pointer of the processor component, a type of the cache event indicating whether the cache event is a RFO cache event or a HITM cache event, and an identifier of a core to enable debugging;

a counter component for execution by the processor component to configure a counter of the monitoring unit to enable capture of the indication of the state of the processor component at a frequency less than every occurrence of the cache event; and a filter component for execution by the processor component to:

determine whether the race condition is between a first access to the piece of data by a first portion of an application routine executed by the processor component and a second access to the piece of data by a second portion of the application routine based on an identifier of at least one of the first portion, the second portion, a core of the processor component that executes one of the first and second portions, or a thread of execution of one of the first and second portions, and remove the indication from the monitoring data based on the cache event not arising from the race condition between the first access to the piece of data by the first portion of the application routine executed by the processor component and the second access to the piece of data by the second portion of the application routine to generate reduced data comprising a subset of multiple indications of the state of the processor component of the monitoring data.

6. The apparatus of claim 5, the trigger component to dynamically enable the capture of the indication based on whether an application routine comprising multiple portions for concurrent execution by the processor component is currently executed by the processor component.

7. The apparatus of claim 5, wherein the first access comprising a write operation and the second access comprising one of a read operation and a write operation.

8. The apparatus of claim 5, the race condition comprising a race condition between a read operation of a first application routine executed by the processor component in a first thread of execution to read the piece of data, and a write operation of a second application routine executed by the processor component in a second thread of execution to write to the piece of data.

9. An apparatus to detect race conditions comprising:

a first hardware processor component;

a second hardware processor component;

a trigger component stored in a memory which when executed by the processor components configure a monitoring unit of the first hardware processor component to detect a cache event associated with a race condition between accesses to a piece of data and to capture a first indication of a state of the first hardware processor component as a first monitoring data in response to an occurrence of the cache event, and to configure a monitoring unit of the second hardware processor component to detect the cache event and to capture a second indication of a state of the second hardware processor component as a second monitoring data in response to an occurrence of the cache event, the cache event comprising a read-for-ownership (RFO) cache event or a hit-modified (HITM) cache event based on a cache coherency mechanism; and a filter component to:

determine whether the race condition is between first and second portions of an application routine based on an identifier of at least one of the first portion, the second portion, a core of the first hardware processor component that executes one of the first and second portions, a core of the second hardware processor component that executes one of the first and second portions, or a thread of execution of one of the first and second portions, and remove at least one of the first indication and the second indication in a reduced data based on the cache event not arising from the race condition between access to the piece of data by the first portion of an application routine executed by one of the first and second hardware processor components and the access to the piece of data by the second portion of the application routine executed by one of the first and second hardware processor components.

10. The apparatus of claim 9, the trigger component to dynamically enable the capture of the first indication and the second indication based on whether an application routine comprising multiple portions for concurrent execution by at least one of the first hardware processor component and the second hardware processor component is currently executed by at least one of the first hardware processor component and the second hardware processor component.

11. The apparatus of claim 9, comprising a counter component to configure a counter of the monitoring unit of each of the first and second hardware processor components to enable the capture of the first indication and the second indication at a frequency less than every occurrence of the cache event.

12. The apparatus of claim 11, the counter component to configure the counter of the monitoring unit of the first hardware processor component and the counter of the monitoring unit of the second hardware processor component to synchronize the capture of the first indication and the capture of the second indication.

13. The apparatus of claim 9, comprising the filter component compare the first and second indications and to generate the reduced data comprising the first indication and not the second indication based on redundancy of the second indication to the first indication.

14. The apparatus of claim 9, wherein the indication of the state comprises an identifier of a core to enable debugging.

15. At least one non-transitory machine-readable storage medium comprising instructions that when executed by a processor component, cause the processor component to:

detect a cache event arising from a race condition between accesses to a piece of data by at least one application routine executed by the processor component, the cache event comprising a read-for-ownership (RFO) cache event or a hit-modified (HITM) cache event based on a cache coherency mechanism;

recurringly capture an indication of a state of the processor component as monitoring data in response to an occurrence of the cache event at a selected interval of multiple occurrences of the cache event, each instance of the indication of the state comprising an address of an instruction pointer of the processor component and a type of the cache event indicating whether the cache event is a RFO cache event or a HITM cache event;

determine whether the race condition is a read operation of a first portion of the application routine and a write operation of a second portion of the at least one application routine based on an identifier of at least one of the first portion, the second portion, a core of the processor component that executes one of the first and second portions, or a thread of execution of one of the first and second portions; and remove the indication from the monitoring data based on the cache event not arising from the race condition between the read operation of the first portion of the application routine and the write operation of a second portion of the application routine to generate a reduced data comprising a subset of multiple indications of the state of the processor component of the monitoring data.

16. The at least one non-transitory machine-readable storage medium of claim 15, the processor component caused to dynamically enable the capture of the indication based on whether the application routine is currently at least partly executed by the processor component.

17. The at least one non-transitory machine-readable storage medium of claim 15, the race condition comprising a race condition between a read operation of the application routine executed by the processor component in a first thread of execution to read the piece of data, and a write operation of another application routine executed by the processor component in a second thread of execution to write to the piece of data.

18. The at least one non-transitory machine-readable storage medium of claim 15, each instance of the indication comprising at least one of contents of a register of the processor component, an indication of what access operation triggered the cache event, or an identifier of a thread of execution on which an access operation that triggered the cache event was executed.

19. The at least one non-transitory machine-readable storage medium of claim 15, the cache event involving a cache of the processor component.

20. The at least one non-transitory machine-readable storage medium of claim 15, the processor component caused to capture an indication of a state of another processor component as another monitoring data in response to the occurrence of the cache event at the selected interval of multiple occurrences of the cache event.

21. The at least one non-transitory machine-readable storage medium of claim 20, the processor component caused to remove the indication of the state of the other processor component from the other monitoring data based on the cache event not arising from a race condition between a first access to the piece of data by a first portion of the application routine and a second access to the piece of data by a second portion of the application routine to generate a reduced data comprising a subset of multiple indications of the state of the processor component of the monitoring data and a subset of multiple indications of the state of the other processor component of the other monitoring data.

22. The at least one non-transitory machine-readable storage medium of claim 15, wherein each instance of the indication of the state comprises an identifier of a core to enable debugging.

* * * * *